(No Model.)

J. F. WITTEMANN.
PROCESS OF CARBONATING FERMENTED BEVERAGES.

No. 487,342. Patented Dec. 6, 1892.

WITNESSES:
Charles Schroeder
Charles Bles

INVENTOR
Jacob F. Wittemann
BY
ATTORNEYS

United States Patent Office.

JACOB F. WITTEMANN, OF YONKERS, NEW YORK.

PROCESS OF CARBONATING FERMENTED BEVERAGES.

SPECIFICATION forming part of Letters Patent No. 487,343, dated December 6, 1892.

Application filed February 10, 1891. Serial No. 381,008. (No model.)

*To all whom it may concern:*

Be it known that I, JACOB F. WITTEMANN, a citizen of the United States, and a resident of the city of Yonkers, Westchester county, State of New York, have invented certain new and useful Improvements in Processes of Carbonating Fermented Beverages, of which the following is a specification.

The object of my invention is to furnish an improved process for carbonating fermented beverages in such a manner that the beverage can be kept for a considerable length of time in good condition and is capable of resisting changes of temperature and climatic influences, and by which any degree of "life" and effervescence is imparted thereto; and my invention consists of a process of carbonating fermented beverages by subjecting said beverage first to an atomizing or spraying action in an atmosphere of carbonic-acid gas under pressure, next drawing off the liberated air from the atomizing-vessel, then impregnating the liquid with carbonic-acid gas, and lastly drawing off the carbonated beverage under pressure into suitable distributing-vessels.

Figure 1:
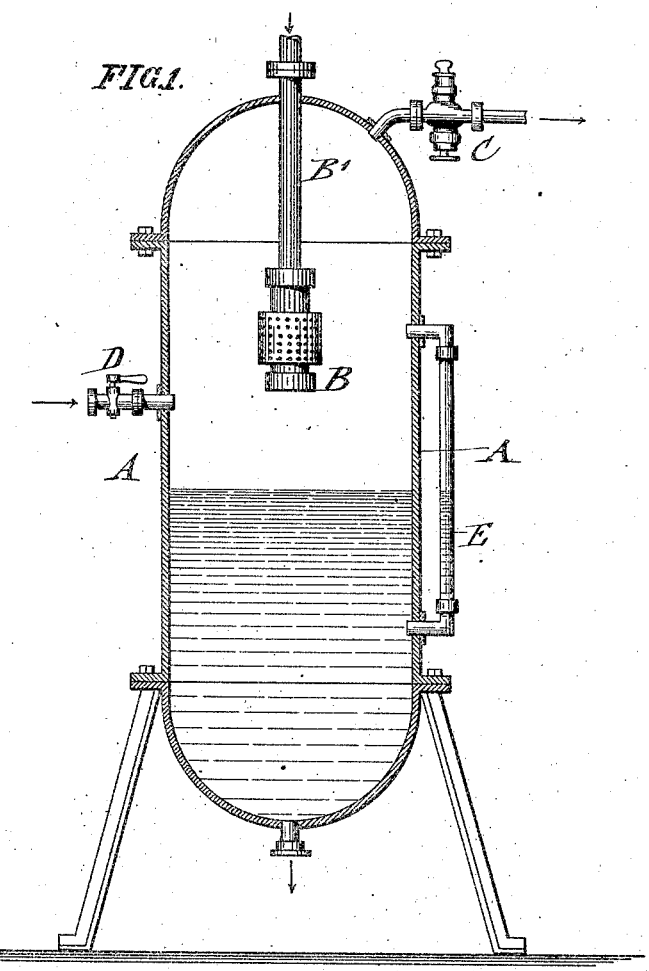
Figure 2:
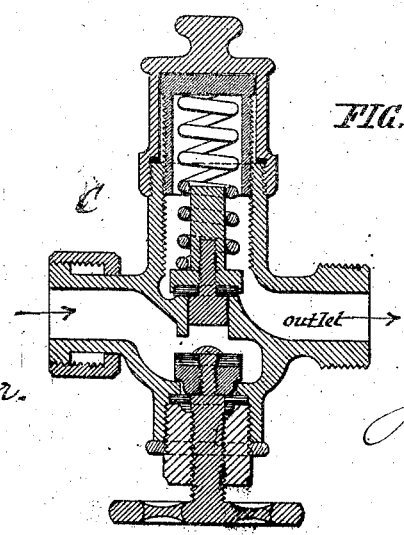

In the accompanying drawings, Figure 1 represents a vertical central section of one form of apparatus by which my improved process of carbonating fermented liquors is carried on; and Fig. 2 is a vertical longitudinal section of a blow-off valve, drawn on a larger scale.

Similar letters of reference indicate corresponding parts in both the figures.

After the beverage to be treated is fermented and clarified by any suitable means it is forced into a closed vessel or tank A, which contains carbonic-acid gas under pressure. The supply-pipe B′ is provided inside of the vessel A with a spray-head B, through which the fermented beverage is ejected, so as to be subjected to the atomizing and spraying action of the same. This atomizing process may be repeated, if desired, by conducting the liquid under pressure into a second or third impregnating-vessel of a similar construction. The impregnating-vessel A is provided with a valved supply-pipe D for the carbonic-acid gas and with a suitable gage E for indicating the level of the liquid in the vessel A.

The atomizing or spraying of the beverage produces the separation of the greater part of the air contained in the beverage and the incorporation of carbonic-acid gas with the same, the carbonic-acid gas taking the place of the air that is absorbed by the beverage during the prior treatment of the same and while the same is in contact with atmospheric air. The air which is liberated by the atomizing action is collected in the upper part of the closed vessel A and is preferably drawn off from said vessel either continuously or intermittently. The atomizing of the beverage is mainly carried on with a view for producing the separation of the air from the beverage and the replacing of the same by carbonic-acid gas. By thus liberating the atmospheric air the main cause by which the acid fermentation in the beverage is engendered is removed and the beverage thereby placed in a superior condition for preservation. The carbonating of the beverage is completed by the presence of carbonic-acid gas under pressure in the vessel.

The air that is liberated by the atomizing process may be conducted off by a self-regulating blow-off valve C, which is shown in Fig. 2 and which is arranged at the top part of the atomizing-vessel. In place of the blow-off valve any other suitable means may be used for drawing off the air. By the thorough impregnation of the beverage with carbonic-acid gas increased life and freshness are imparted to the same. As the incorporation of the carbonic-acid gas with the beverage takes place while the same is in an atomized condition, the beverage is more intimately impregnated with the gas and retains the same for a considerable length of time even after the pressure on the same is removed, so that thereby an increased and long-continued effervescence is imparted to the beverage. After treatment the beverage is drawn off under the pressure of carbonic-acid gas maintained in the impregnating-vessel into suitable distributing-vessels—such as kegs or other receptacles—by any one of the usual methods.

While drawing off the carbonated beverage into the suitable distributing-vessels care has to be taken that this is accomplished under a uniform pressure, so as to avoid agitation, foaming, and loss of gas.

The process as herein described is especially adapted for carbonating beer, wine, and cider, as it dispenses with the steaming of the beverages in the bottles and supplies to the same a fresh taste, great durability, and considerable life and effervescence when decanted.

Having thus described my invention, what I claim as new, and desire to secure by Letters Patent, is—

The process herein described of preserving fermented beverages, which consists in subjecting the beverage to an atomizing or spraying action in an atmosphere of carbonic-acid gas under pressure, permitting the beverage to accumulate under pressure below said carbonic-acid gas, permitting the air liberated from the atomized beverage to accumulate under pressure above the carbonic-acid gas and to automatically blow off at intervals, and drawing off the beverage under pressure of the gas and bottling said beverage under said pressure, substantially as set forth.

In testimony that I claim the foregoing as my invention I have signed my name in presence of two subscribing witnesses.

JACOB F. WITTEMANN.

Witnesses:
PAUL GOEPAL,
MARION HALL.